(12) United States Patent
Hotta et al.

(10) Patent No.: US 8,441,689 B2
(45) Date of Patent: May 14, 2013

(54) IMAGE DATA CREATION DEVICE, IMAGE DATA CREATION METHOD AND INK-JET SYSTEM

(75) Inventors: Hiroshi Hotta, Nagano (JP); Yuji Uchiyama, Tokyo (JP)

(73) Assignee: Kimoto Co., Ltd., Tokyo (JP)

( * ) Notice: Subject to any disclaimer, the term of this patent is extended or adjusted under 35 U.S.C. 154(b) by 319 days.

(21) Appl. No.: 12/935,096

(22) PCT Filed: Mar. 24, 2009

(86) PCT No.: PCT/JP2009/055752
§ 371 (c)(1),
(2), (4) Date: Sep. 28, 2010

(87) PCT Pub. No.: WO2009/122952
PCT Pub. Date: Oct. 8, 2009

(65) Prior Publication Data
US 2011/0019236 A1    Jan. 27, 2011

(30) Foreign Application Priority Data
Mar. 31, 2008 (JP) .................................. 2008-092095

(51) Int. Cl.
*H04N 1/405* (2006.01)
(52) U.S. Cl.
USPC ........................................................ 358/3.06

(58) Field of Classification Search ................. 358/3.06; 400/124.01, 62, 70; 347/41, 19, 14; 101/463.1
See application file for complete search history.

(56) References Cited

U.S. PATENT DOCUMENTS

| | | | |
|---|---|---|---|
| 6,517,267 B1 * | 2/2003 | Otsuki | ..................... 400/124.01 |
| 2007/0221082 A1 * | 9/2007 | Fukui et al. | ................ 101/463.1 |

FOREIGN PATENT DOCUMENTS

| | | |
|---|---|---|
| JP | 2000-37937 | 2/2000 |
| JP | 2003-237042 A1 | 8/2003 |
| WO | WO 2006/006598 A1 | 1/2006 |

OTHER PUBLICATIONS

International Search Report for International Application No. PCT/JP2009/055752 dated Apr. 22, 2009.

* cited by examiner

*Primary Examiner* — Charlotte M Baker
(74) *Attorney, Agent, or Firm* — Kratz, Quintos & Hanson, LLP

(57) ABSTRACT

A host PC that creates image data used in an ink-jet printer capable of landing ink with a multi-pass method includes an image data creation means that creates the image data so that the ink-jet printer forms an image with a halftone dot which is configured so that a relationship between a pass number and a dot pitch in a vertical scanning direction of an ink-jet head does not become an integral multiple relationship when the pass number is odd number, and a dot pitch does not become even number when the pass number is even number.

9 Claims, 9 Drawing Sheets

CASE THAT CELL NUMBER IS ODD NUMBER
HALFTONE DOT

CASE THAT CELL NUMBER IS EVEN NUMBER
HALFTONE DOT

EACH DENSITY IS 50%

IMAGE DATA CREATION DEVICE, IMAGE DATA CREATION METHOD AND INK-JET SYSTEM

TECHNICAL FIELD

The present invention relates to an image data creation device, an image data creation method and an ink-jet system and, in particular, to an image data creation device, an image data creation method and an ink jet system that creates image data used in an ink-jet device capable of landing ink with a multi-pass method.

BACKGROUND ART

Offset printing is a printing method in which ink adhering to a printing plate surface is not directly transferred to paper, but the ink is once transferred to a rubber blanket or the like and then transferred to a material to be printed such as paper. Although there are various methods for making offset printing plates, they can be roughly classified into analog plate-making methods using PS plates and direct plate-making methods using a comparatively simple DTP technique, as the most common methods.

The plate-making methods using PS plates constitute the mainstream of the conventional methods, in which a photographic film of an original is prepared beforehand, and then superimposed on a PS plate comprising an aluminum substrate on which a photosensitive resin is laminated, and light exposure (printing) and dissolution of unexposed portions (development) are performed to obtain the aluminum plate on which exposed portion remain as a printing plate.

On the other hand, the direct plate-making methods are methods of directly forming original images on a substrate such as plastic or aluminum plates without using a block copy film as in the conventional methods, and electrophotographic methods and silver photographic methods have conventionally been used in many cases. However, methods based on the ink-jet method, thermal transfer method, or discharge transfer method are also practically used.

Among the direct plate-making methods, those using the ink-jet method are techniques existing from old time and they are methods of scanning a surface of a support having an image receiving layer with a printing means based on the ink-jet method discharging droplets of lipophilic ink to form images of a printing plate.

According to the methods of this type, a printing plate can be directly made without a procedure of once printing out electronized information of an original as a hard copy, and they further have convenience that, for example, the information of the original can be stored in a storage medium, and freely edited on a personal computer or the like.

Patent Reference 1 suggests a technique which seems to relate to the present invention.
[Patent Reference 1] Japanese Patent Application Publication No. 2000-037937

DISCLOSURE OF THE INVENTION

Problems to be Solved by the Invention

An FM screen and an AM screen are used to express gradation. The FM screen is a method of expressing gradation by the density of dots located randomly, and has an advantage that moiré and banding hardly occur because dots do not have regularity.

On the other hand, the AM screen is a method of expressing gradation by various sizes of halftone dots located regularly, and is a common method of printing.

When the AM screen is used to form an image, a halftone dot is formed by landing ink by the multi-pass method. The multi-pass method is a method of forming an image area by dividing nozzles provided to a head of an ink-jet device evenly into multiple notional blocks and filling up gaps between landed inks with ink discharged from each block at every scan. According to the multi-pass method, the image with the resolution that is higher than the resolution achieved by one-time scanning of the head can be formed. The multi-pass method corresponds to the multi-scanning printing method disclosed in Japanese Patent Application Publication No. 2000-037937.

Generally, as nozzles provided to the head of the ink-jet device vary, the quantity of discharged ink and the discharge direction of ink vary. Therefore, when the multi-pass method is not used, an inhomogeneity occurs. When a halftone dot of the AM screen is formed by landing ink by the multi-pass method, the inhomogeneity is reduced. The FM screen is generally used for the ink-jet method, but it is desirable to use the AM screen for offset printing.

However, when a halftone dot of the AM screen is formed by landing ink by the multi-pass method, if the landing order of ink changes, a shape of halftone dot changes and the image may be formed by the halftone dot of which shape changes periodically.

FIG. 1 is a schematic diagram illustrating halftone dots of which shape changes periodically. For example, when the halftone dot is composed so that the dot pitch (four in this case) in the vertical scanning direction of the head of the ink-jet device which is expressed with a dot (hereinafter, referred to also as ink) unit becomes an integral multiple (one-multiple in this case) of the pass (hereinafter, referred to also as scan) number (four in this case), the halftone dot is composed regularly with respect to the landing order of ink.

However, depending on the setting of pass number or the like, the phenomenon that the order of dots forming the halftone dot in the subsequent image area of a certain image area, which is completed by the multi-pass, shifts may occur.

In this case, the order of dots forming the halftone dot shifts periodically in every image area completed by the multi-pass, and therefore the image is formed by the halftone dots of which shape changes periodically. In this case, as the order of dots forming the halftone dot is regular in each image area, each image area formed by halftone dots, of which shape differs from that of the other image area, forms its band, and it may lead to the recognition that the periodical banding occurs in the image.

When the ink absorbability of a material to be printed is low or the ink lands onto an area where the ink cured, the shape of landed ink easily changes.

The present invention is made in views of above problems, and the aim of the present invention is to provide an image data creation device, an image data creation method and an ink-jet system capable of preventing an occurrence of banding, which is caused by the periodical change of a shape of halftone dot, in the image formed by an ink-jet device that is able to land inks by the multi-pass method.

Means for Solving the Problems

To solve above problems, the present invention is an image data creation device that creates image data used in an ink-jet device capable of landing ink with a multi-pass method, the image data creation device including an image data creation unit that creates the image data so that the ink-jet device forms an image with a halftone dot which is configured so that a relationship between a pass number and a dot pitch in a vertical scanning direction of a head of the ink-jet device does not become an integral multiple relationship when the pass number is odd number, and so that a dot pitch does not become even number when the pass number is even number.

Moreover, the present invention is an image data creation method that creates image data used in an ink-jet device capable of landing ink with a multi-pass method, the image data creation method including creating the image data so that the ink-jet device forms an image with a halftone dot which is configured so that a relationship between a pass number and a dot pitch in a vertical scanning direction of a head of the ink-jet device does not become an integral multiple relationship when the pass number is odd number, and a dot pitch does not become even number when the pass number is even number.

Moreover, the present invention is an ink-jet system that includes an ink jet device capable of landing ink with a multi-pass method, and an image data creation device that creates image data used in the ink-jet device, the image data creation device including an image data creation means that creates the image data so that the ink-jet device forms an image with a halftone dot which is configured so that a relationship between a pass number and a dot pitch in a vertical scanning direction of a head of the ink-jet device does not become an integral multiple relationship when the pass number is odd number, and a dot pitch does not become even number when the pass number is even number.

Moreover, in the present invention, the ink-jet device may be an ink-jet device for making an offset printing plate.

Moreover, in the present invention, the ink used in the ink-jet device may be an ink that has an ionizing radiation curing property.

Effects of the Invention

According to the present invention, it is possible to prevent an occurrence of banding, which is caused by the periodical change of a shape of halftone dot, in the image formed by an ink-jet device that is able to land ink by a multi-pass method.

BEST MODES FOR CARRYING OUT THE INVENTION

A description will now be given, with reference to accompanying drawings, of best embodiment of the present invention.

Figure 1:
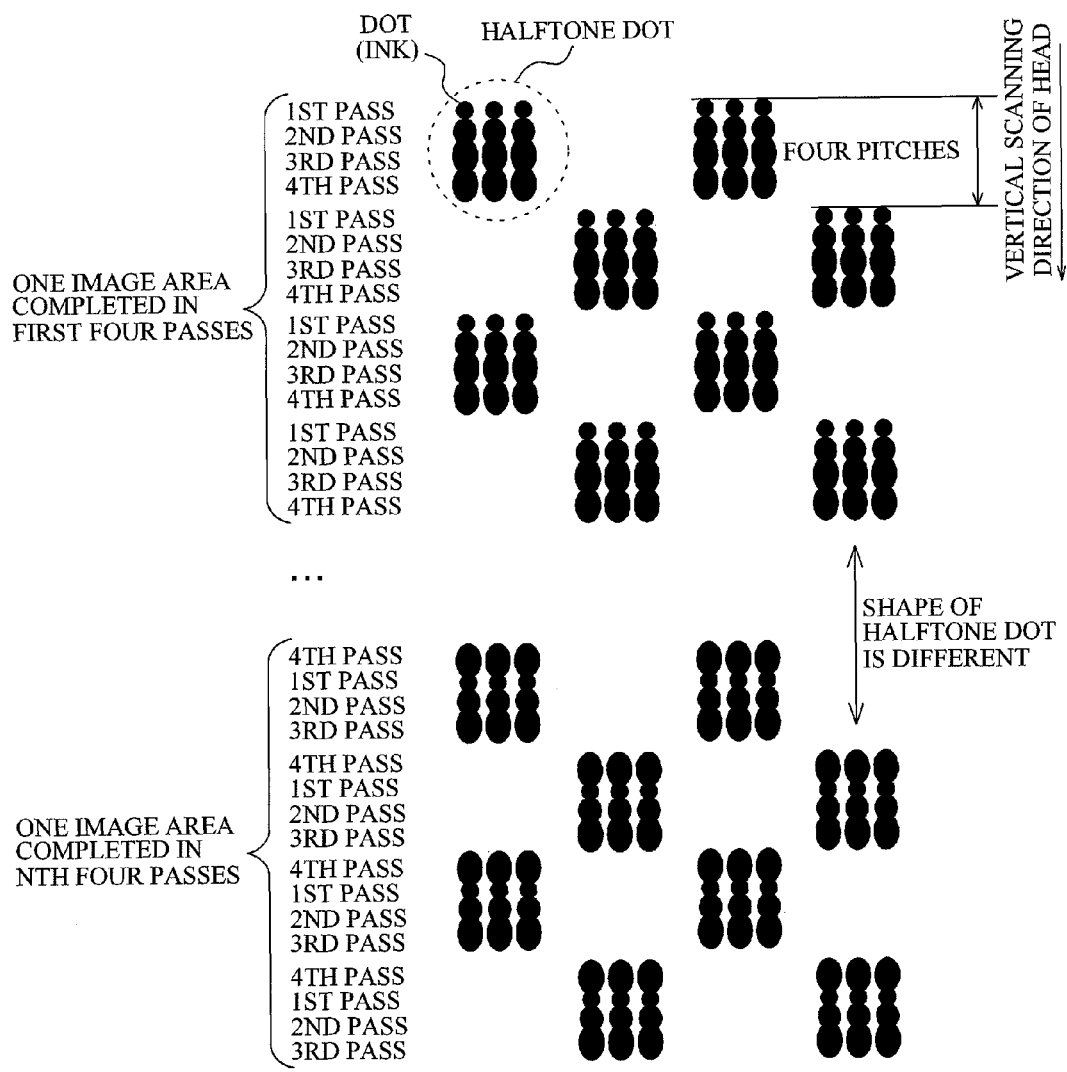
FIG. 1 is a schematic diagram illustrating halftone dots of which shape changes periodically.
Figure 2:
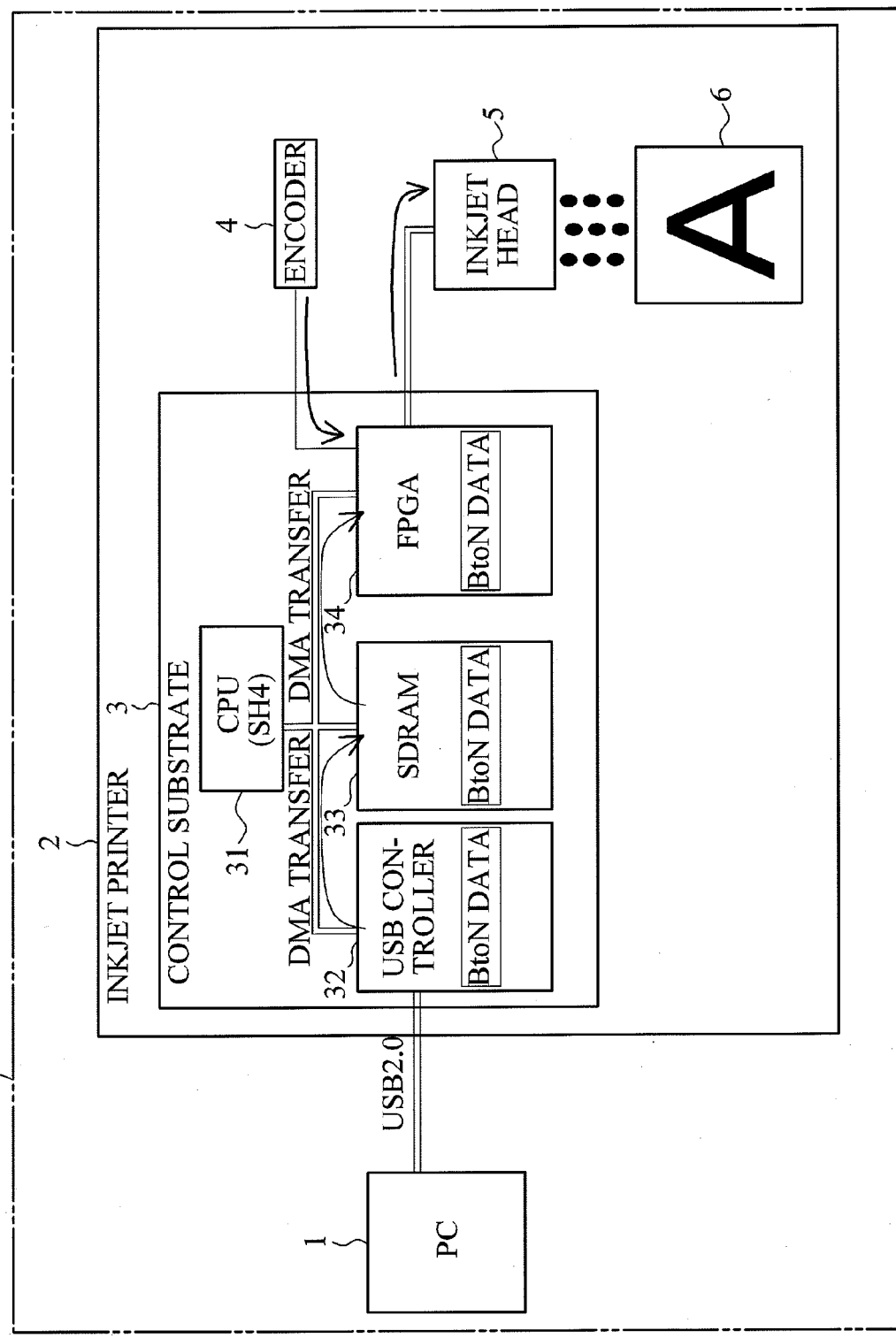
FIG. 2 is a schematic diagram illustrating an ink-jet system.

FIG. 2 is a schematic diagram illustrating an ink jet system 10 in accordance with this embodiment. The ink-jet system 10 is composed by including a host PC 1 (corresponding to an image data creation device) and an ink-jet printer 2 (corresponding to an ink-jet device). The host PC 1 is a component to provide image data to the ink-jet printer 2, and is a personal computer including a computer (not shown) provided with a CPU, a ROM, a RAM and the like in the internal. The host PC 1 is coupled to the ink-jet printer 2 so as to be capable of data communication, and specifically, is coupled to the ink-jet printer 2 by USB2.0 in the present embodiment.

The ink-jet printer 2 is composed by including a control substrate 3, an encoder 4 and an ink-jet head 5 (corresponding to a head). The ink-jet printer 2 is one for making an offset printing plate, forms an image on a plate 6 with the AM screen in a binary manner. Plastic or aluminum plate is used for the plate 6, for example. The encoder 4 is a detection means of the position of the ink-jet head 5, and detects a position of the ink-jet head 5 in a scanning direction. The ink-jet head 5 is a component to land ink on the plate 6.

Lipophilic ink is used in the ink-jet printer 2. Among lipophilic inks, an ink that has an ionizing radiation (such as ultraviolet rays and electron rays) curing property is preferable from the viewpoint of printing durability. Here, the description will be given by using the ink (UV ink) which has the ultraviolet ray curing property as an example. The UV ink is configured to cure rapidly by the UV lamp, which is not illustrated, when the ink lands. About this point, in the ink-jet method, the landed ink generally expands by running, and the shape tends to easily change, and when the ink is the UV ink, the ink laps over the area where the ink cured, and especially the shape of landed ink easily changes.

The ink-jet head 5 is provided with multiple nozzles, which land ink, along the different direction from the scanning direction of the head (along the vertical scanning direction which is the feed direction of the plate 6 here). The ink-jet head 5 can obtain the image with a resolution of 360 dpi in one-time scanning of the head by using these multiple nozzles. On the other hand, the ink-jet printer 2 can land ink by the multi-pass method, and this makes the resolution of the image improved.

The control substrate 3 is composed by including a CPU 31, a USB controller 32, an SDRAM 33, and an FPGA (Field Programmable Gate Array) 34. Image data is input to the USB controller 32 from the host PC 1 through the USB2.0. The ink-jet printer 2 receives this image data in the data unit of the order of head nozzle described later at every scan. The received image data is stored in the SDRAM 33. The image data stored in the SDRAM 33 is transferred to the FPGA 34 by using DMA (Direct Memory Access) transfer in accordance with the timing of discharging ink. The FPGA 34 performs the ink-jet control to the ink-jet head 5 based on the obtained image data. According to this, the ink-jet head 5 discharges the ink from given nozzles when scanning, and forms image according to the image data.

The description will now be given of a method of creating image data performed by the host PC 1 with reference to FIG.

3. An image file of the image that the user wants to print is created or prepared by using a layout application such as drawing software or word processing software (step S11). This image file is created or prepared with given format such as PDF. Then, the user converts this image file into binary halftone dot data by using a dedicated software (program) (step S12). This dedicated software is one for creating image data used in the ink-jet printer 2. The process of creating image data, which includes processes of conversion into the binary halftone dot data and conversion into head nozzle order data for every scan performed in the next step, is an information processing achieved by the cooperation between this dedicated software and the host PC 1 which is a hardware. The data converted into the binary halftone dot data is further converted into the head nozzle order data for every scan based on the dedicated software (step S13). The image data is provided to the ink-jet printer 2 in the unit of the head nozzle data for every scan.

Figure 4A:
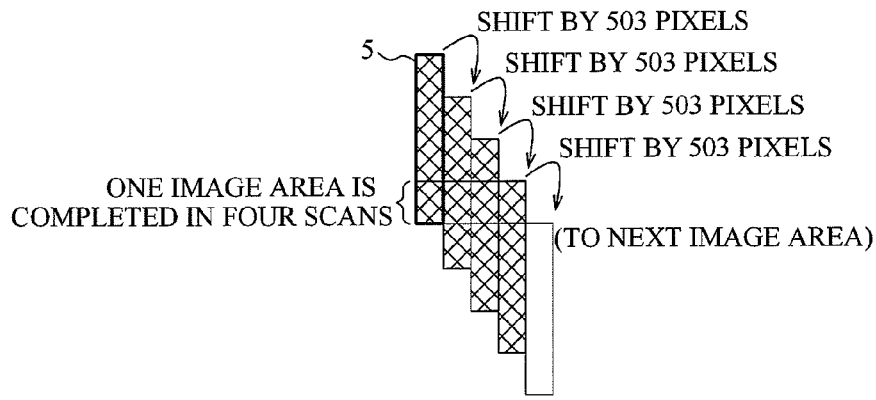
FIGS. 4A through 4C are diagrams to explain a multi-pass method.
Figure 4B:
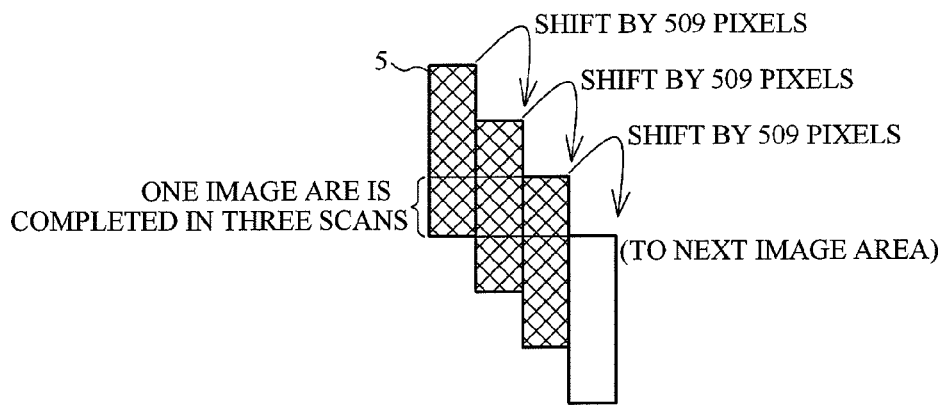
Figure 4C:
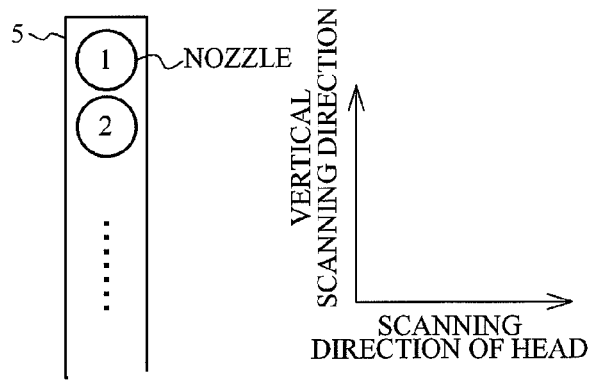

The detail description will now be given of the multi-pass method. FIGS. 4A through 4C are diagrams to explain the multi-pass method. Specifically, FIG. 4A is a diagram to explain the multi-pass method of forming the image in four passes. FIG. 4B is a diagram to explain the multi-pass method of forming the image in three passes. FIG. 4C schematically illustrates a layout of nozzles in the ink-jet head 5 for reference. To make the description understood easily, FIGS. 4A and 4B illustrate the ink jet head 5 by shifting the position of the ink-jet head 5 to the scanning direction of the head at every scan, and express the relative position of the ink-jet head 5 to the plate 6 (hereinafter, referred to as the relative position simply) by shifting the position of the ink-jet head 5 to the vertical scanning direction at every scan.

In the example illustrated in FIG. 4A, an image area is formed by basically dividing five hundred and three nozzles evenly into four notional blocks so that each block has one hundred and twenty six nozzles (but one out of four blocks has one hundred and twenty five nozzles), and filling up gaps between landed inks with ink discharged from each of four blocks at every scan.

In this case, a first block is composed of 1st through 126th nozzles, a second block is composed of 127th through 252nd nozzles, a third block is composed of 253rd through 378th nozzles, and a fourth block is composed of 379th through 503rd nozzles.

When the ink-jet head 5 scans, the relative position of the ink-jet head 5 is shifted by 503 pixels at every scan. This makes it possible to land ink so that each block fills up gaps and complete one image area in four scans.

As described above, when one image area is completed in four passes, the image with a resolution of 1440 dpi which is four times of 360 dpi can be obtained.

When one image area is formed in three passes, one image area is formed by basically dividing five hundred and nine nozzles evenly into three notional blocks so that each block has one hundred and seventy nozzles (but one out of three blocks has one hundred and sixty nine nozzles), and filling up gaps between landed inks with ink discharged from each of three blocks at every scan.

In this case, a first block is composed of 1st through 170th nozzles, a second block is composed of 171st through 340th nozzles, and a third block is composed of 341st through 509th nozzles.

When the ink-jet head 5 scans, the relative position of the ink-jet head 5 is shifted by 509 pixels at every scan. This makes it possible to land the ink so that each block fills up gaps and complete one image area by three scans.

As described above, when one image area is completed in three passes, the image with a resolution of 1080 dpi which is three times of 360 dpi can be obtained.

Figure 5:
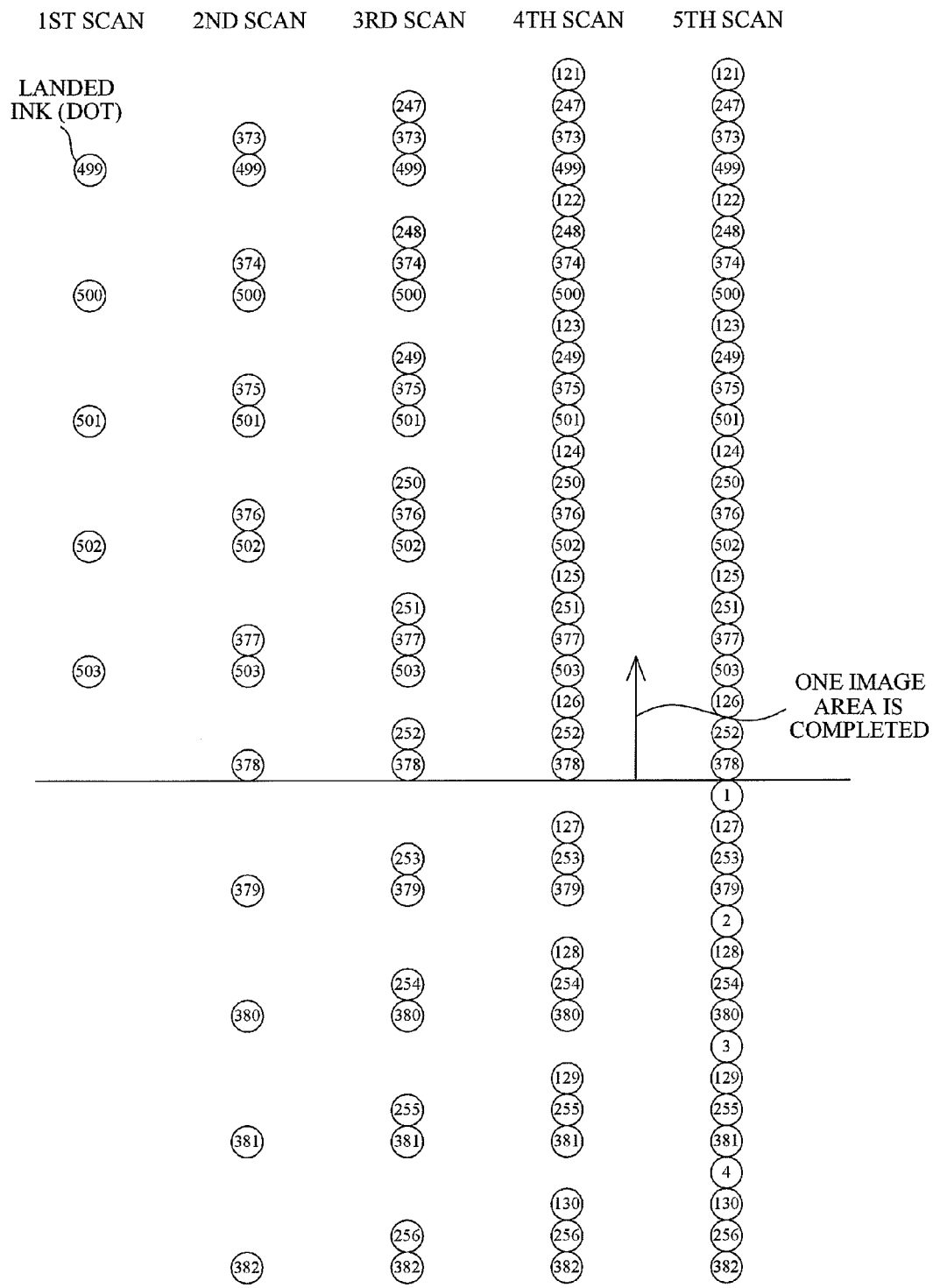
FIG. 5 is a schematic diagram illustrating a printing process when a solid printing is performed in four passes.

The description will now be given of the printing process when performing solid printing in four passes as illustrated in FIG. 4A with reference to FIG. 5. FIG. 5 schematically illustrates the main part of printing process. The ink jet head 5 discharges ink from nozzles at the first scan. At this time, the 379th through 503rd inks discharged from nozzles (379th through 503rd nozzles) of the fourth block become inks to form one image area in the first four passes comprised of the first scan through the fourth scan. The 1st through 378th nozzles do not discharge ink at the first scan.

Then, the relative position of the ink-jet head 5 is shifted by 503 pixels, and the ink-jet head 5 discharges ink from nozzles at the second scan. At this time, the 253rd through 378th inks discharged from nozzles (the 253rd through 378th nozzles) of the third block become inks to form one image area in the first four passes. The 1st through 252nd nozzles do not discharge ink at the second scan.

In the same manner, inks are discharged at the third scan and the fourth scan. At the third scan, inks discharged from nozzles (the 127th through 252nd nozzles) of the second block become inks to form one image area in the first four passes, and at the fourth scan, inks discharged from nozzles (the 1st through 126th nozzles) of the first block become inks to form one image in the first four passes. The 1st through 126th nozzles do not discharge ink at the third scan.

According to this, one image area of solid printing is completed in the area above the 378th ink of the second scan on the paper in the first four passes comprised of the first scan through the fourth scan. Then, the next four passes are comprised of the second through fifth scans, the four passes after the next are comprised of the third through sixth scans, and one image area of solid printing is completed in the same manner respectively.

In such a printing process, as the first through third blocks have one hundred and twenty six nozzles respectively and the fourth block has one hundred and twenty five nozzles as described above, the ink is not discharged from nozzles of the fourth block to a joint area between image areas (a final area of the image area). Therefore, the area where inks discharged from nozzles of the first through third blocks (126th, 252nd and 378th inks specifically) land and form solid printing appears at the final area of the image area (See FIG. 6).

This creates a phenomenon that the landing order of inks comprising the halftone dot changes in every image area when the halftone dot is configured so that the dot pitch (hereinafter, referred to as a pitch) of the ink-jet head 5 in the vertical scanning direction becomes even number in a case that the pass number is even number for example. When the halftone dot is configured so that the relationship between the pass number and the pitch of the ink-jet head 5 in the vertical scanning direction becomes an integral multiple relationship in a case that the pass number is odd number for example, the landing order of inks comprising the halftone dot changes in every image area.

Figure 6:
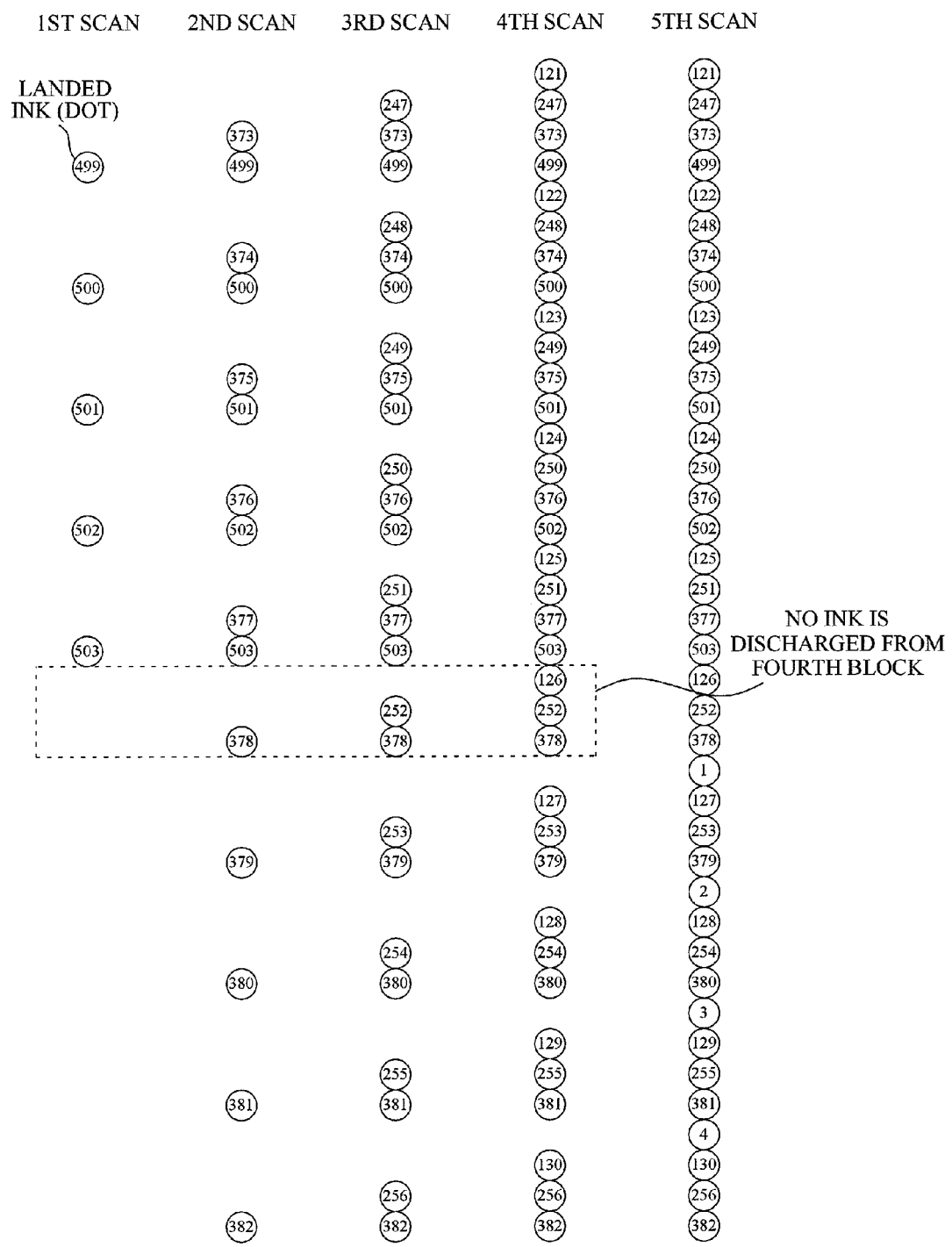
FIG. 6 is a diagram to explain an area where a solid printing is formed without discharging ink from nozzles of the fourth block.
Figure 7:
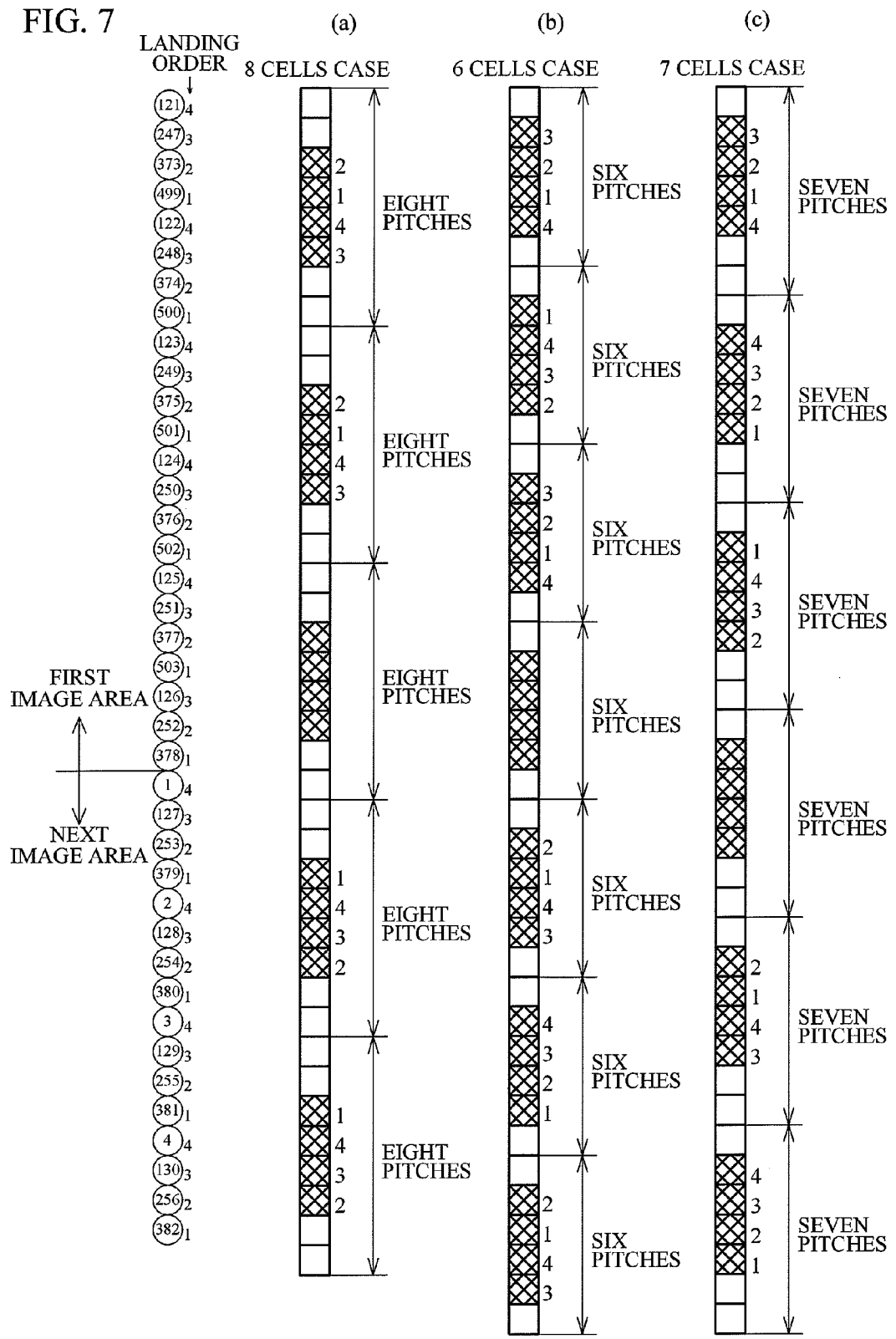
FIG. 7 is a schematic diagram illustrating the landing order of ink when halftone dots having different number of lines in accordance with the solid printing are applied.

FIG. 7 is a schematic diagram illustrating the landing order of ink in a case that the number of lines of the halftone dot is changed in accordance with the solid printing described in FIG. 5 or FIG. 6 is applied (the pass number is four in (a), (b) and (c) of FIG. 7). In FIG. 7, the pitch is expressed with the cell number, and hereinafter, the pitch is referred to also as the cell number. As illustrated in (a) of FIG. 7, in terms of the landing order of ink to four central cells, when the halftone dot is composed of eight cells, in the first image area except the final, area the landing order of ink is the order of 2, 1, 4 and 3 but in the next image area the landing order of ink is the order of 1, 4, 3 and 2.

When the pass number is even number (four), and the halftone dot is configured to be composed of eight cells (the pitch is even number), the landing order of ink changes periodically in every image area. Therefore, when the pass number is four and the halftone dot is composed of eight cells, the image area is recognized as a band.

In terms of the landing order of ink to the four central cells, when the halftone dot is composed of six cells as illustrated in (b) of FIG. 7, the landing order of ink alternately becomes the order of 3, 2, 1 and 4 and the order of 1, 4, 3 and 2 in the first image area, and the landing order of ink alternately becomes the order of 2, 1, 4 and 3 and the order of 4, 3, 2 and 1 in the next image area.

As described above, when the pass number is even number (four) and the halftone dot is configured to be composed of six cells (the pitch is even number), the landing order of ink periodically changes in every image area. Therefore, when the pass number is four and the halftone dot is composed of six cells, the image area is recognized as a band.

On the other hand, in terms of the landing order of illustrated four cells, when the halftone dot is composed of seven cells as illustrated in (c) of FIG. 7, the landing order of ink becomes the order of 3, 2, 1 and 4, the order of 4, 3, 2 and 1, and the order of 1, 4, 3 and 2 from the upper area in the first image area, and becomes the order of 2, 1, 4 and 3 and the order of 4, 3, 2 and 1 from the upper area in the next image area.

As described above, when the pass number is even number (four) and the halftone dot is configured to be composed of seven cells (the pitch is not even number but odd number), the landing order of ink changes even in the same image area. As this makes it difficult that the image area is recognized as a band, the occurrence of banding can be prevented.

Preventing an occurrence of banding with the above method has advantage especially in printing the material to be printed with low ink absorbability by the ink-jet method in view of the changeability of the shape of landed ink, and is preferable especially when the ink-jet printer 2 is one for an offset printing plate as described in the present embodiment.

As the curing time of the ink which has the ionizing radiation curing property is short, when dots at the nth-scan are spotted, the dots spotted before the nth-scan have already cured. As described above, as it is difficult that the ink is absorbed into the area where the ink has already cured, the change of the landing shape becomes large when the ink laps over the cured area. As each dot slightly laps over each other, the change of landing shape of dot after the second scan tends to become larger when the ink having the ionizing radiation curing property is used. Therefore, the present invention is effective when the ink has the ionizing radiation curing property.

Figure 3:
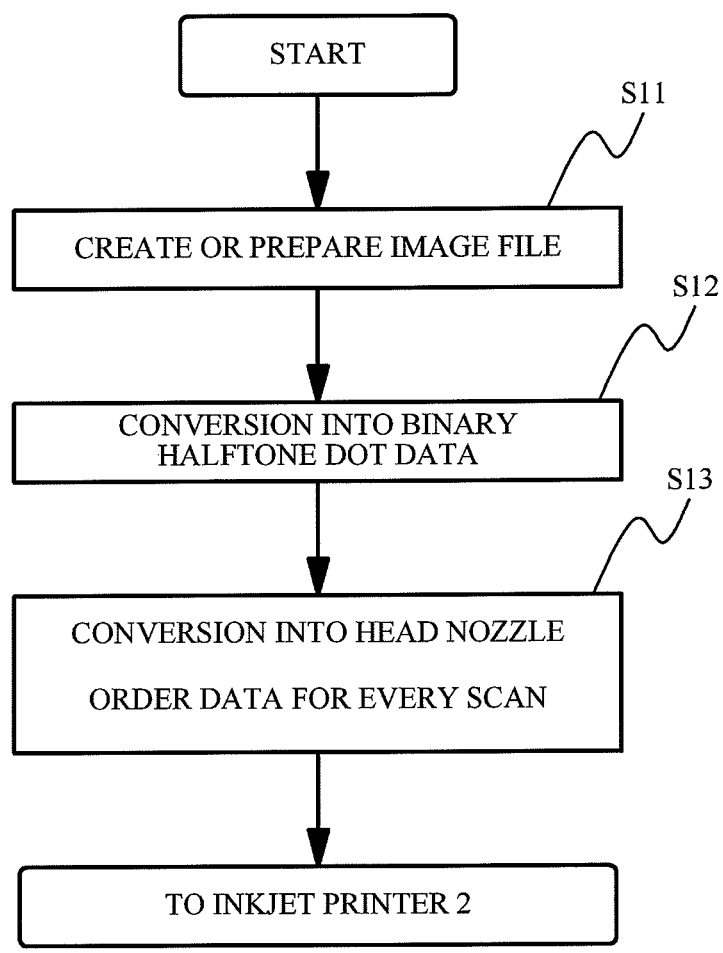
FIG. 3 is a flowchart illustrating a method of creating image data, which is performed by a host PC.
Figure 8:
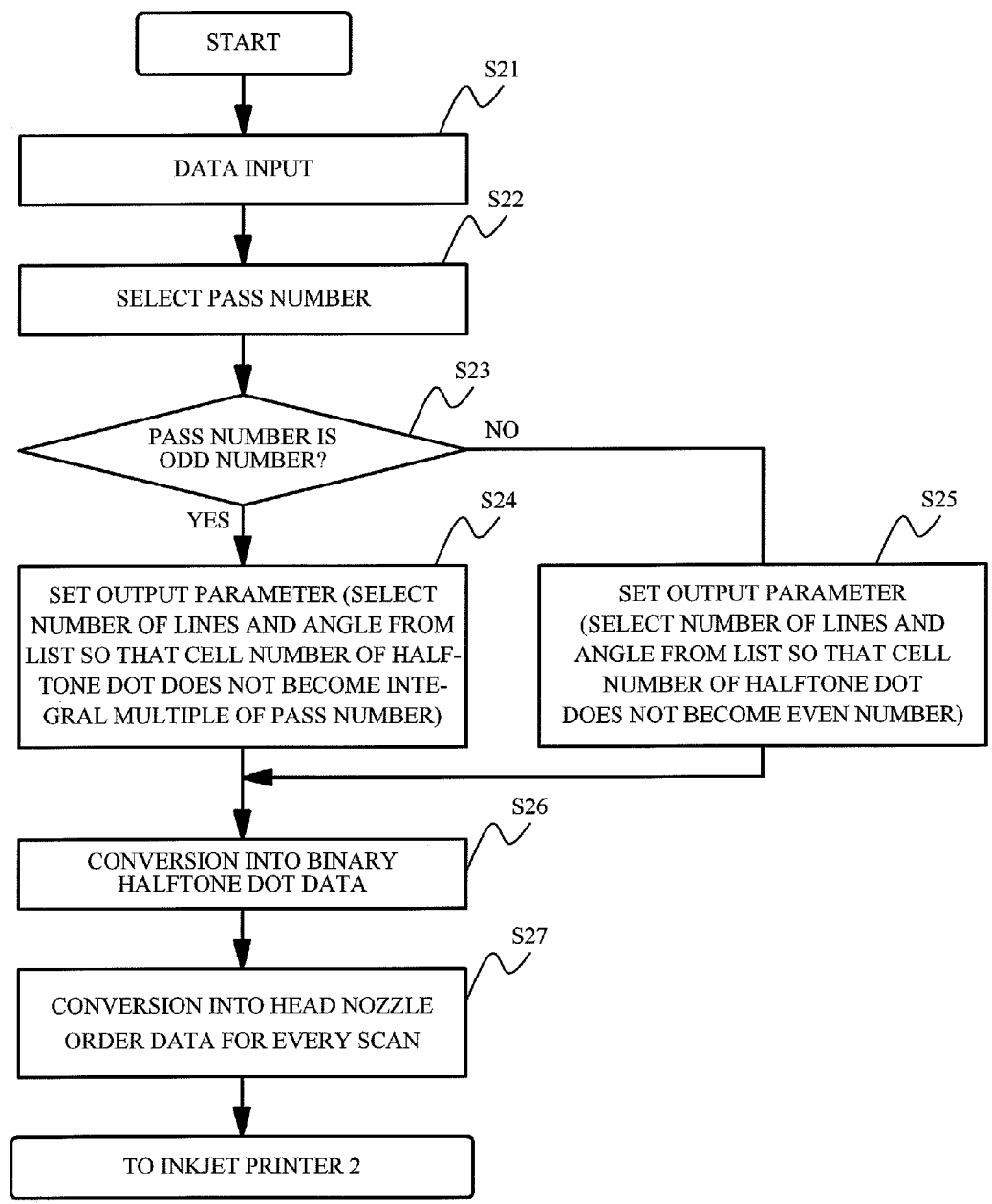
FIG. 8 is a flowchart illustrating a method of creating image data so as to compose halftone dots so that the relationship between the number of cells and the pass number does not become an integral multiple relationship.

A description will now be given of the method of creating image data to configure the halftone dot so that the banding does not occur, with reference to a flowchart illustrated in FIG. 8. Data is input in the host PC 1 (step S21). This data input corresponds to creating or preparing an image file in the host PC and starting an image data creation process with a dedicated software as described in FIG. 3. When the image data creation process using the dedicated software is started, the host PC 1 selects the pass number (step S22). Then the host PC 1 determines whether the selected pass number is odd number (step S23).

When the pass number is odd number, the determination of the step S23 is YES. Then the process moves to a step S24, and the host PC 1 sets the output parameter. More specifically, the output parameter includes the number of lines and an angle, and the host PC 1 selects the number of lines and the angle, which do not make the relationship between the cell number of the halftone dot and the pass number become the integral multiple relationship, from the list stored in the ROM beforehand. The number of lines and the angle that are regarded empirically as possible to be used are stored in the list beforehand.

On the other hand, when the pass number is even number, the determination of the step S23 is NO. Then the process moves to a step S25, and the host PC 1 sets the output parameter. In this case, the number of lines and the angle, which do not make the cell number of halftone dot be even number, is selected from the list stored in the ROM beforehand.

Figure 9B:
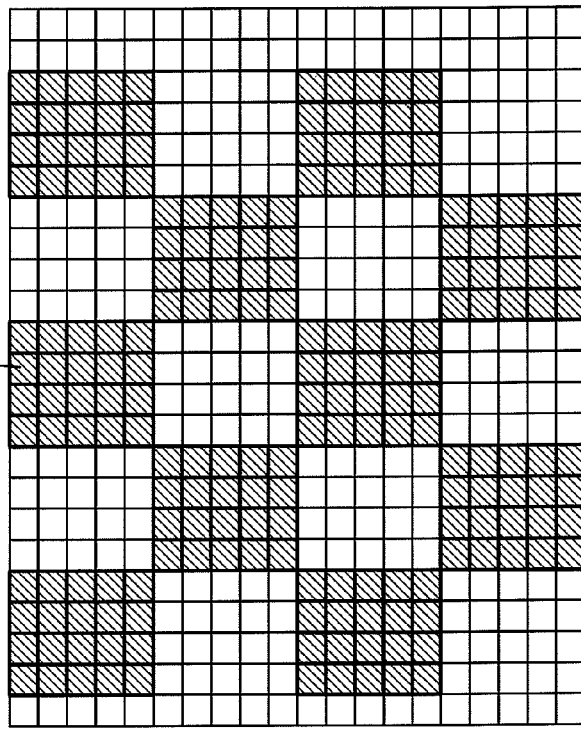
FIGS. 9A and 9B are diagrams to explain an example that the gradation of an image can be made same even though the number of cells of halftone dots is changed.
Figure 9A:
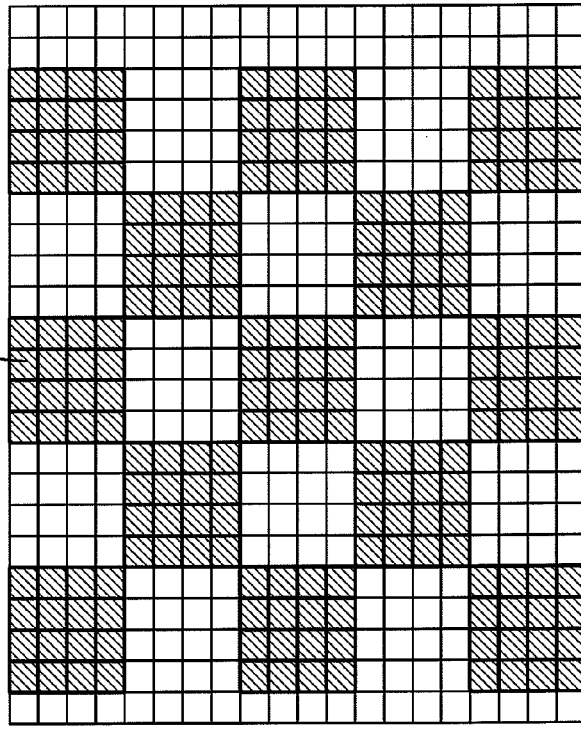

It is possible to make the density of image equal even though the cell number of halftone dot is changed. The image with a density of 50% can be achieved by making the cell number be even number (specifically, four in this case) or odd number (specifically, five in this case) as illustrated in FIGS. 9A and 9B.

After the step S24 or S25, the host PC 1 creates binary halftone dot data based on the setting (step S26), converts the created binary halftone dot data into head nozzle order data for every scan (step S27), and provides it to the ink-jet printer 2. The procedures illustrated in steps S22 through S26 correspond to the procedures practically indicating the procedures performed in the step S12 of the flowchart illustrated in FIG. 3 described before.

In the present embodiment, the image data creation unit described in claims is functionally achieved by the execution of procedures indicated in steps S22 through S27 by the host PC 1 based on the dedicated software. In the present embodiment, the image data creation method described in claims is achieved by the host PC 1 that executes procedures indicated in steps S22 through S27.

As described, the host PC 1 and the ink-jet system 10 are able to prevent the occurrence of banding caused by the periodical change of a shape of halftone dot in an image that the ink-jet printer 2 capable of landing ink with the multi-pass method forms.

Although detail descriptions are given of a preferred embodiment of the present invention, the present invention is not limited to the specifically described embodiment and variation, but other embodiments and variations may be made without departing from the scope of the present invention.

The invention claimed is:

1. An image data creation device that creates image data used in an ink-jet device capable of landing ink with a multi-pass method, the image data creation device comprising:
    an image data creation unit that creates the image data so that the ink-jet device forms an image with halftone dots which are configured so that a relationship between a pass number and a dot pitch in a vertical scanning direction of a head of the ink-jet device does not become an integral multiple relationship when the pass number is an odd number, and so that the dot pitch does not become an even number when the pass number is even number, wherein
    the pass number is a number that represents a number of times that the head of the ink-jet device moves in a scanning direction to complete a single image region,
    the dot pitch represents a number of cells in the vertical scanning direction that constitutes one of the halftone dots in a printed image, and
    the single image region is completed by dividing nozzles, which are provided to the head of the ink-jet device successively in the vertical scanning direction, into multiple notional blocks, and filling up gaps between landed inks with ink discharged from each block by scanning a number of times equal to the pass number that is equal to a number of the multiple notional blocks.

2. The image data creation device according to claim 1, wherein the ink-jet device is an ink-jet device for making an offset printing plate.

3. The image data creation device according to claim 1, wherein an ink used in the ink jet device is an ink that has an ionizing radiation curing property.

4. An image data creation method that creates image data used in an ink jet device capable of landing ink with a multi-pass method, the image data creation method comprising:
creating the image data so that the ink jet device forms an image with halftone dots which are configured so that a relationship between a pass number and a dot pitch in a vertical scanning direction of a head of the ink-jet device does not become an integral multiple relationship when the pass number is an odd number, and the dot pitch does not become an even number when the pass number is an even number, wherein
the pass number is a number that represents a number of times that the head of the ink-jet device moves in a scanning direction to complete a single image region,
the dot pitch represents a number of cells in the vertical scanning direction that constitutes one of the halftone dots in a printed image, and
the single image region is completed by dividing nozzles, which are provided to the head of the ink-jet device successively in the vertical scanning direction, into multiple notional blocks, and filling up gaps between landed inks with ink discharged from each block by scanning a number of times equal to the pass number that is equal to a number of the multiple notional blocks.

5. The image data creation method according to claim 4, wherein the ink-jet device is an ink-jet device for making an offset printing plate.

6. The image data creation method according to claim 4, wherein an ink used in the ink-jet device is an ink that has an ionizing radiation curing property.

7. An ink-jet system comprising:
an ink-jet device capable of landing ink with a multi-pass method; and
an image data creation device that creates image data used in the ink-jet device,
wherein the image data creation device comprises an image data creation unit that creates the image data so that the ink jet device forms an image with halftone dots which are configured so that a relationship between a pass number and a dot pitch in a vertical scanning direction of a head of the ink-jet device does not become an integral multiple relationship when the pass number is an odd number, and the dot pitch does not become an even number when the pass number is an even number, wherein
the pass number is a number that represents a number of times that the head of the ink-jet device moves in a scanning direction to complete a single image region,
the dot pitch represents a number of cells in the vertical scanning direction that constitutes one of the halftone dots in a printed image, and
the single image region is completed by dividing nozzles, which are provided to the head of the ink-jet device successively in the vertical scanning direction, into multiple notional blocks, and filling up gaps between landed inks with ink discharged from each block by scanning a number of times equal to the pass number that is equal to a number of the multiple notional blocks.

8. The ink jet system according to claim 7, wherein the ink-jet device is an ink-jet device for making an offset printing plate.

9. The ink jet system according to claim 7, wherein an ink used in the ink-jet device is an ink that has an ionizing radiation curing property.

* * * * *